J. J. Powers. Treating Cotton Seed.

No. 112628

Patented Mar 14 1871

Witnesses:
E. Wolff
Wm. H. C. Smith

Inventor:
J. J. Powers
pr Munn & Co
Attorneys

United States Patent Office.

JOSEPH J. POWERS, OF MEMPHIS, TENNESSEE.

Letters Patent No. 112,628, dated March 14, 1871.

IMPROVEMENT IN TREATING COTTON-SEED.

The Schedule referred to in these Letters Patent and making part of the same.

*To all whom it may concern:*

Be it known that I, JOSEPH J. POWERS, of Memphis, in the county of Shelby and State of Tennessee, have invented a new and useful Improvement in Treating Cotton-seed; and I do hereby declare that the following is a full, clear, and exact description, which will enable others skilled in the art to make and use the same, reference being had to the accompanying drawing forming part of this specification.

This invention relates to improvements in preparing cotton-seed for shipping, whereby it may be preserved in a hulled and ground condition, before expressing the oil, in a sweet and healthy state for any length of time required by the exigencies of trade, or for shipping upon long routes at sea.

The invention consists in subjecting the ground meal or the unground hulled seed, previous to packing for market, to a heating process, preferably in a revolving-cylinder, over a fire or steam-heating apparatus, and then to a cooling and drying process in another revolving-cylinder, through which a current of air is blown by a fan.

The cylinders are preferably used for the heating and drying operations, being the most convenient and economical, but other equivalent or competent means may be used.

Figure 1:
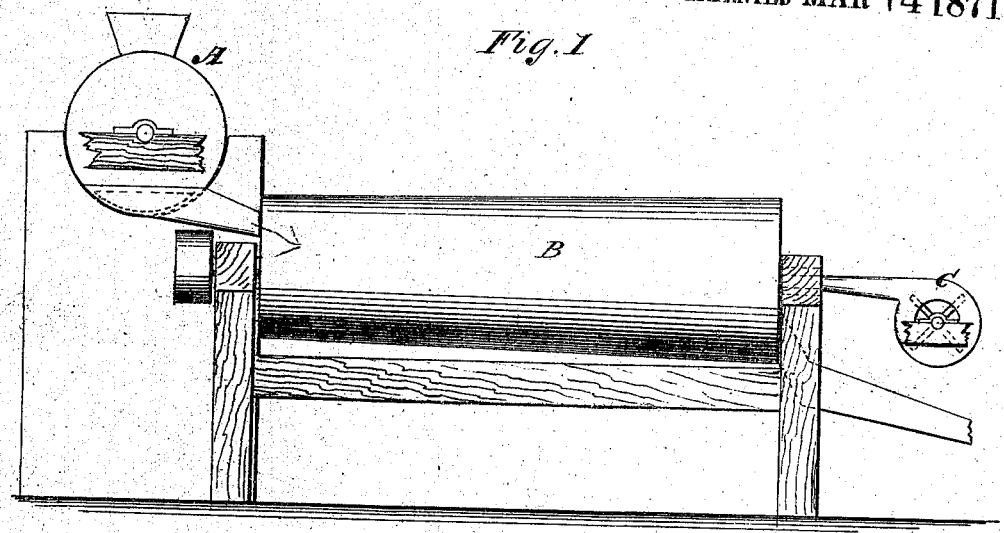
Figure 2:
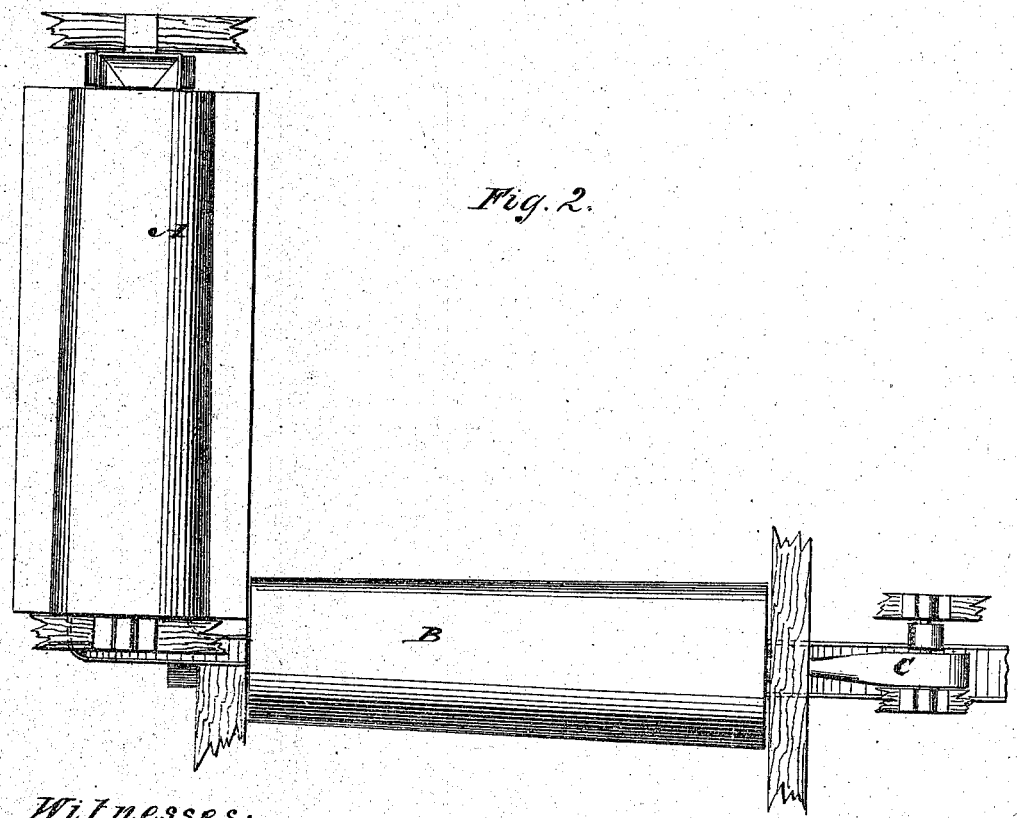

Figure 1 is a side elevation of apparatus which may be used in carrying out my invention; and Figure 2 is a plan view of the same.

Cotton-seed yields a large amount of oil, which is useful for various purposes, and has of recent date been resorted to considerably, the oil being extracted by hulling and grinding the seed and pressing the meal. The meal is also useful as food for animals, after the oil has been extracted, also for fertilizing.

But up to the present time the vast quantities of cotton-seed now produced in the Southern States, and estimated to possess a large percentage of the money value for useful purposes of the cotton itself, if properly utilized, has been almost wholly wasted for want of a successful mode of treatment, whereby it may be shipped with economy and success.

While the seed may be shipped previous to removing the hulls to domestic and foreign markets without deteriorating, it is inexpedient to do so, on account of the extra cost of freight, due to the great proportion of weight and bulk of the hull, and which is entirely useless, the same being about half the total weight.

Therefore, efforts have been made to ship the hulled seed, which have resulted very disastrously to the shippers, owing to the seed becoming rancid in a very short time by the action of the atmosphere upon the unprotected seed and the water and oil contained in it.

This result has necessitated the grinding and pressing of the seed in the localities where it is produced, and the shipping therefrom of the oil and the pressed cake.

While by this plan the oil and cake may be delivered in market with tolerably satisfactory results, yet great loss often occurs by the cake becoming damp and rancid on shipboard; also, by breaking and wasting; and a considerable percentage of oil is lost by leakage of barrels. It is objectionable on account of the necessity of the work being done in small and imperfectly-arranged mills throughout the country, where capital and skilled labor are scarce and expensive. It is also objectionable on account of the expensive packages required for the oil.

For these and other reasons it is highly important, for the successful development of this important and comparatively new industry, that the meal, separated from the hull, may be conveyed to market, before pressing the oil from it, in a condition in which it will keep sweet and healthy for a long time.

I have therefore adopted the plan of subjecting the ground meal to the action of heat for expelling the water, and to a cooling and drying process, in which the air is blown through it while in a state of motion, for carrying off the condensed steam adhering to it after passing from the fire, and rapidly cooling it, so that it may be packed in bags, barrels, or other cheap packages, with considerable pressure, whereby it will be so condensed as not to absorb moisture afterward, and be in such condition as to be shipped conveniently.

This separation of the water not only facilitates the preservation of the meal, but it reduces the weight by the amount of the water expelled, and therefore cheapens the cost of shipping.

In carrying out this mode of treatment, I propose to conduct the ground meal from the grinding-mill to a revolving-cylinder A, of sheet metal, working over a fire, or steam heat, applied in any way to heat it as it passes through from one end to the other; and from this cylinder I conduct it by any suitable means to another, B, wherein it is subjected to the action of a gentle blast of air from a fan-blower, C, as it passes along through, by which it will not only be cooled, but the moisture adhering to it by reason of the partial condensation of the water, expelled from it in vapors by the heat, will be dried away.

I may employ any other suitable means or apparatus for heating and drying the meal, but I prefer such an arrangement as here shown.

I may also apply the same treatment to the seed while in the kernel, after being hulled, with good results; and I propose, in some cases, to do it in this way afterward, grinding and packing it; or I may pack it in the kernel; but generally it will be preferaable to dry and cool it in the meal, as the operation can be carried on more rapidly, owing to the disintegrated condition of the seed.

I am aware that it is not new to dry corn or other grain in the seed, by passing it through a heated cylinder or over heated pans, and I do not therefore claim this process of drying broadly; but I do claim as new and desire to secure by Letters Patent,—

The treatment of cotton-seed meal or hulled cotton-seed by a heating and drying process, previous to packing for shipment, substantially as herein specified.

The above specification of my invention signed by me this 15th day of February, 1871.

JOSEPH J. POWERS.

Witnesses:
GEO. W. MABEE,
ALEX. F. ROBERTS.